(12) United States Patent
Park et al.

(10) Patent No.: US 10,444,600 B2
(45) Date of Patent: Oct. 15, 2019

(54) VOICE COIL MOTOR

(71) Applicant: LG INNOTEK CO., LTD., Seoul (KR)

(72) Inventors: Sang Ok Park, Seoul (KR); Seong Min Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 15/679,975

(22) Filed: Aug. 17, 2017

(65) Prior Publication Data

US 2017/0343886 A1   Nov. 30, 2017

Related U.S. Application Data

(63) Continuation of application No. 14/827,964, filed on Aug. 17, 2015, now Pat. No. 9,766,532, which is a
(Continued)

(30) Foreign Application Priority Data

Nov. 16, 2011  (KR) ......................... 10-2011-0119348
Dec. 29, 2011  (KR) ......................... 10-2011-0145805
Dec. 29, 2011  (KR) ......................... 10-2011-0145808

(51) Int. Cl.
*G03B 13/34* (2006.01)
*G02B 15/14* (2006.01)
(Continued)

(52) U.S. Cl.
CPC ............... *G03B 13/34* (2013.01); *G02B 7/02* (2013.01); *G02B 7/04* (2013.01); *G02B 7/08* (2013.01);
(Continued)

(58) Field of Classification Search
CPC .......... G03B 3/10; G03B 13/32; G03B 13/34; G03B 17/00; G03B 17/02; G03B 17/08;
(Continued)

(56) References Cited

U.S. PATENT DOCUMENTS 6,675,931 B2   1/2004   Sahyoun
7,360,626 B2   4/2008   Sahyoun
(Continued)

FOREIGN PATENT DOCUMENTS

JP   2008-268404 A   11/2008
JP   2008-281863 A   11/2008
(Continued)

OTHER PUBLICATIONS

Office Action dated Feb. 22, 2018 in Korean Application No. 10-2011-0119348.
(Continued)

*Primary Examiner* — Loha Ben
(74) *Attorney, Agent, or Firm* — Saliwanchik, Lloyd & Eisenschenk

(57) ABSTRACT

A VCM is disclosed, the motor including a stator including a first driving unit, a rotor arranged inside the stator, including a second driving unit responding to the first driving unit and mounted therein with a lens, a base fixing the stator, and an elastic member coupled to the rotor to float the rotor from the base in a case a driving signal for driving the first and second driving units is not applied to the first and second driving units.

28 Claims, 9 Drawing Sheets

Related U.S. Application Data continuation of application No. 14/464,271, filed on Aug. 20, 2014, now Pat. No. 9,140,881, which is a continuation of application No. 13/676,578, filed on Nov. 14, 2012, now Pat. No. 8,929,005.

(51) Int. Cl.

| | | |
|---|---|---|
| *G02B 7/02* | (2006.01) | |
| *H02K 41/03* | (2006.01) | |
| *H02K 41/035* | (2006.01) | |
| *H02K 37/12* | (2006.01) | |
| *G03B 3/10* | (2006.01) | |
| *G02B 13/00* | (2006.01) | |
| *G02B 7/10* | (2006.01) | |
| *G02B 7/08* | (2006.01) | |
| *G02B 7/04* | (2006.01) | |
| *G03B 13/32* | (2006.01) | |

(52) U.S. Cl.
CPC ............ *G02B 7/102* (2013.01); *G02B 13/001* (2013.01); *G02B 13/009* (2013.01); *G02B 15/14* (2013.01); *G03B 3/10* (2013.01); *H02K 37/12* (2013.01); *H02K 41/03* (2013.01); *H02K 41/035* (2013.01); *H02K 41/0354* (2013.01); *H02K 41/0356* (2013.01); *G03B 13/32* (2013.01); *G03B 2205/0069* (2013.01)

(58) Field of Classification Search
CPC .... G03B 2005/0069; G02B 7/02; G02B 7/04; G02B 7/08; G02B 7/09; G02B 7/102; G02B 13/001; G02B 13/009; G02B 15/14; G02B 27/64; G02B 27/646; H02K 41/03; H02K 41/035; H02K 41/0354; H02K 41/0356; H02K 37/12; H04N 5/225; H04N 5/2253; H04N 5/2254; H04N 5/2257; H05K 9/0007; H05K 9/0058
USPC ..... 359/811, 814, 823, 824, 554; 310/12.16; 348/208.4, 208.13, 208.99, 373, 374; 396/55
See application file for complete search history.

(56) References Cited

U.S. PATENT DOCUMENTS

| | | | |
|---|---|---|---|
| 7,463,436 B2* | 12/2008 | Takahashi | G02B 7/08 348/345 |
| 8,368,256 B2 | 2/2013 | Yoo et al. | |
| 8,558,419 B2* | 10/2013 | Lee | H02K 41/0356 310/12.16 |
| 8,638,510 B2 | 1/2014 | Lee et al. | |
| 8,836,177 B2 | 9/2014 | Lee et al. | |
| 8,878,400 B2 | 11/2014 | Jung | |
| 9,140,881 B2 | 9/2015 | Park et al. | |
| 9,429,734 B2* | 8/2016 | Park | G02B 7/08 |
| 9,448,383 B2* | 9/2016 | Park | G02B 7/08 |
| 9,766,532 B2* | 9/2017 | Park | G02B 7/102 |
| 2008/0024015 A1 | 1/2008 | Tanioka et al. | |
| 2008/0259467 A1 | 10/2008 | Chung | |
| 2012/0008221 A1 | 1/2012 | Min et al. | |
| 2012/0025633 A1 | 2/2012 | Lee et al. | |
| 2012/0146432 A1 | 6/2012 | Kim et al. | |
| 2012/0200176 A1 | 8/2012 | Park | |
| 2016/0356982 A1 | 12/2016 | Park | |

FOREIGN PATENT DOCUMENTS

| | | |
|---|---|---|
| JP | 2009-282090 A | 12/2009 |
| KR | 10-2009-0026480 A | 3/2009 |
| KR | 10-2010-0001518 A | 1/2010 |
| KR | 10-2010-0112655 A | 10/2010 |
| KR | 10-2010-0129930 A | 12/2010 |
| KR | 10-2011-0013966 A | 2/2011 |
| KR | 10-2011-0034929 A | 4/2011 |
| KR | 10-2011-0062848 | 6/2011 |
| KR | 10-2011-0086936 A | 8/2011 |

OTHER PUBLICATIONS

Office Action dated Apr. 23, 2018 in Korean Application No. 10-2011-0145805.
Office Action dated Apr. 25, 2018 in Korean Application No. 10-2011-0145808.
Office Action dated Nov. 6, 2018 in Korean Application No. 10-2011-0145805.
Office Action dated Nov. 6, 2018 in Korean Application No. 10-2011-0145808.
Office Action dated Apr. 5, 2019 in Korean Application No. 10-2019-0028332.
Office Action dated Jun. 3, 2019 in Korean Application No. 10-2019-0056222.

* cited by examiner

VOICE COIL MOTOR

CROSS-REFERENCE TO RELATED APPLICATIONS

This application is a continuation of U.S. application Ser. No. 14/827,964, filed on Aug. 17, 2015, now U.S. Pat. No. 9,366,532, which is a continuation of U.S. application Ser. No. 14/464,271, filed on Aug. 20, 2014, now U.S. Pat. No. 9,140,881, issued on Sep. 22, 2015, which is a continuation of U.S. application Ser. No. 13/676,578, filed on Nov. 14, 2012, now U.S. Pat. No. 8,929,005, issued on Jan. 6, 2015, which claims the benefit under 35 U.S.C. § 119 of Korean Patent Application No. 10-2011-0119348, filed Nov. 16, 2011; Korean Patent Application No. 10-2011-0145805, filed Dec. 29, 2011; and Korean Patent Application No. 10-2011-0145808, filed Dec. 29, 2011, which are hereby incorporated by reference in their entirety.

BACKGROUND

Field of the Invention

The present disclosure relates to a VCM (Voice Coil Motor), and more particularly to a voice coil motor enabling to bi-directionally drive a rotor using a small current by floating the rotor from a base.

Description of Related Art

Recently, a mobile phone embedded with a super small digital camera has been developed. A conventional super small digital camera used on a mobile phone has suffered from a disadvantage of disablement to adjust a gap between a lens and an image sensor changing an outside light to a digital image or a digital video (moving image). However, recently, a lens driving device such as a voice coil motor capable of adjusting a gap between an image sensor and a lens has been developed to obtain a digital image or a digital video more advanced than that of a conventional super small digital camera.

Generally, a VCM (Voice Coil Motor) is mounted therein with a lens, where a bobbin arranged on a base is vertically moved from the base to adjust a gap between an image sensor arranged at a rear surface of the base and a lens of the camera. The bobbin of the VCM is coupled with a leaf spring to be always brought into contact with the base by elastic force of the leaf spring when the VCM is not operated. That is, the conventional VCM is driven only to one direction relative to the base.

Because the conventional VCM is driven only to one direction, the VCM disadvantageously needs a driving force greater than a self-weight of the bobbin and the elastic force of the leaf spring to drive the VCM, causing a greater increase in power consumption of the VCM. The conventional VCM further suffers from a disadvantage in that, because it needs a driving force greater than a self-weight of the bobbin and the elastic force of the leaf spring, size of coil wound on the bobbin or the leaf spring increases to increase an entire size of the VCM.

BRIEF SUMMARY

The present invention is directed to provide a VCM configured to improve quality of an image by floating the rotor from a base to allow the rotor to bi-directionally drive with a small amount of current, and by realizing a focusing using, by a rotor, a stabilized section, instead of using a rotor un-stabilized section where a rotor is tilted or shaken during driving. The present invention is also directed to provide a VCM configured to inhibit or restrict a tilting of a rotor generated in response to posture of the rotor, and to further reduce power consumption when an infinite focusing area is used.

Technical problems to be solved by the present disclosure are not restricted to the above-mentioned descriptions, and any other technical problems not mentioned so far will be clearly appreciated from the following description by skilled in the art.

An object of the invention is to solve at least one or more of the above problems and/or disadvantages in whole or in part and to provide at least the advantages described hereinafter. In order to achieve at least the above objects, in whole or in part, and in accordance with the purposes of the invention, as embodied and broadly described, and in one general aspect of the present invention, there is provided a VCM, the VCM comprising: a stator including a first driving unit; a rotor arranged inside the stator, including a second driving unit responding to the first driving unit and mounted therein with a lens; a base fixing the stator; and an elastic member coupled to the rotor to float the rotor from the base in a case where a driving signal for driving first and second driving units is not applied to the first and second driving units.

The VCM according to the present disclosure has an advantageous effect in that a rotor is floated from an upper surface of a base when a driving signal is not applied, and a length of a stroke length or a gap between the floated rotor and the upper surface of the base is differently formed from a stroke or a gap between the floated rotor and the cover to realize a low current consumption characteristic or a low power consumption characteristic.

BRIEF DESCRIPTION OF THE DRAWINGS

In the drawings, the width, length, thickness, etc. of components may be exaggerated or reduced for the sake of convenience and clarity. Furthermore, throughout the descriptions, the same reference numerals will be assigned to the same elements in the explanations of the figures, and explanations that duplicate one another will be omitted. Now, a voice coil motor according to the present disclosure will be described in detail with reference to the accompanying drawings.

The teachings of the present disclosure can be readily understood by considering the following detailed description in conjunction with the accompanying drawings, in which.

DETAILED DESCRIPTION

Advantages and features of the present disclosure may be understood more readily by reference to the following detailed description of exemplary embodiments and the accompanying drawings.

Detailed descriptions of well-known functions, configurations or constructions are omitted for brevity and clarity so as not to obscure the description of the present disclosure with unnecessary detail. Thus, the present disclosure is not limited to the exemplary embodiments which will be described below, but may be implemented in other forms.

The meaning of specific terms or words used in the specification and claims should not be limited to the literal or commonly employed sense, but should be construed or may be different in accordance with the intention of a user or an operator and customary usages. Therefore, the definition of the specific terms or words should be based on the contents across the specification.

Now, exemplary embodiments of a VCM (Voice Coil Motor) according to the present disclosure will be explained in detail together with the figures.

First Exemplary Embodiment

Figure 1:
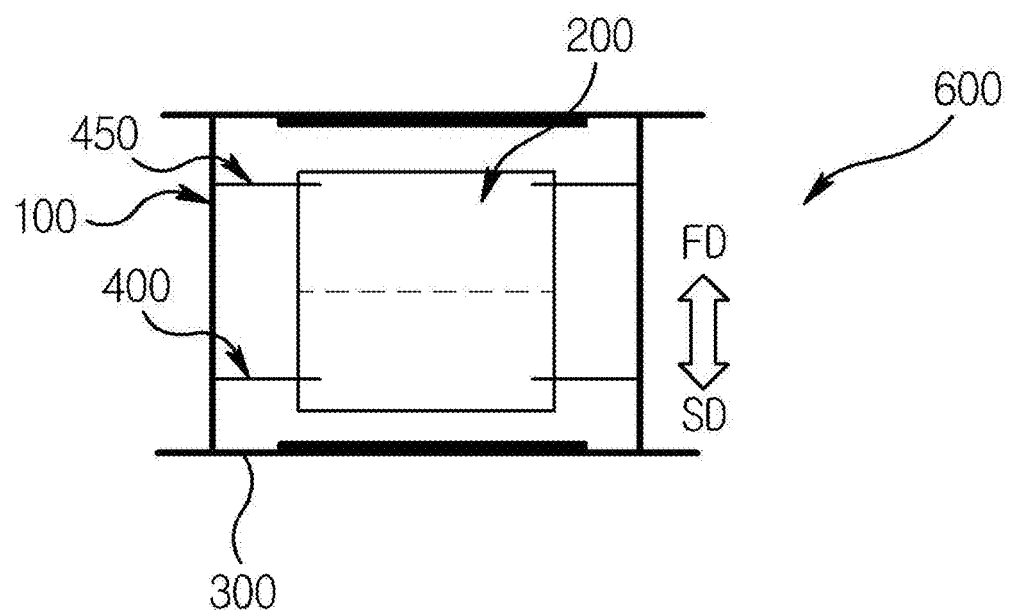
FIG. 1 is a schematic cross-sectional view illustrating a VCM according to a first exemplary embodiment of the present disclosure.
Figure 2:
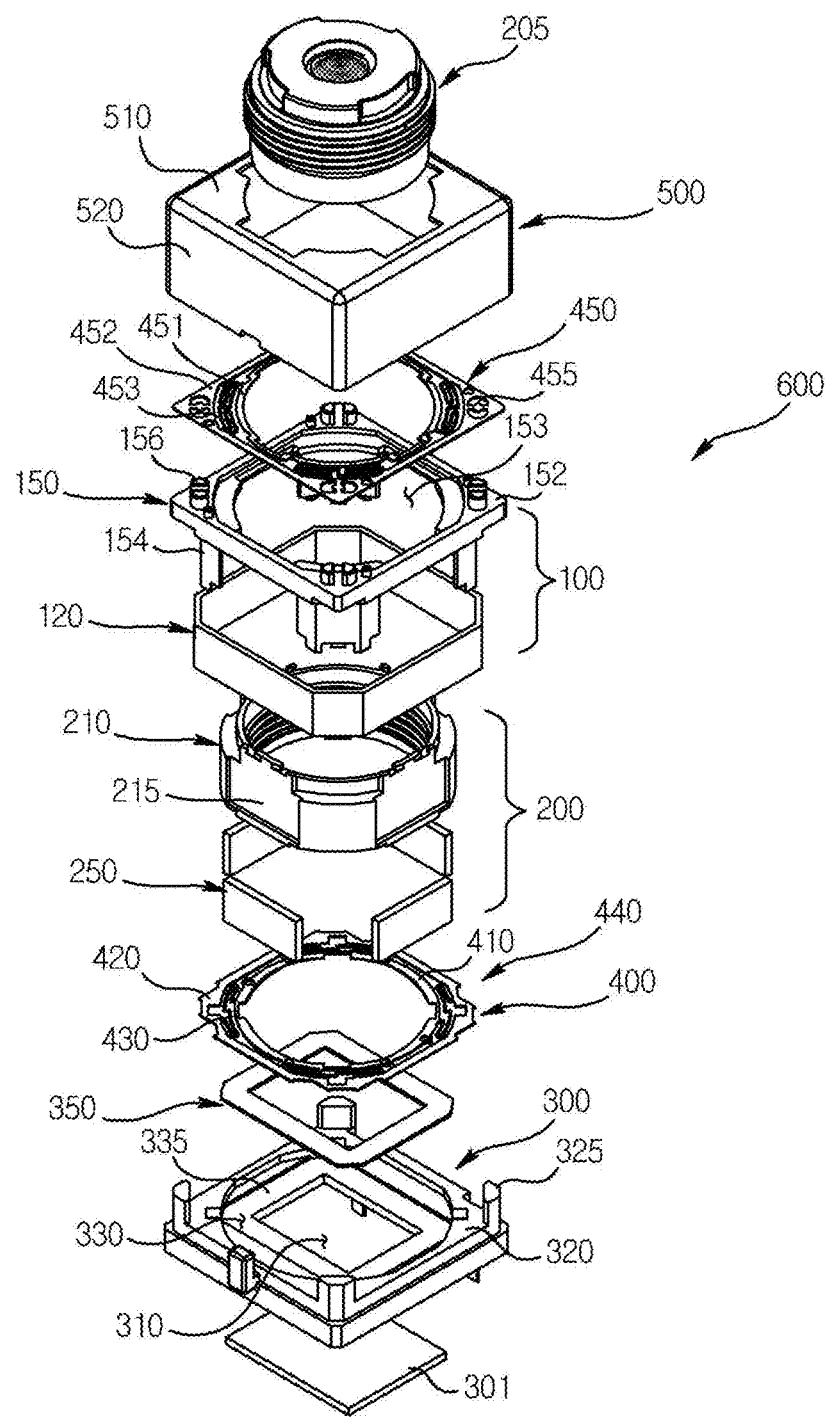
FIG. 2 is an exploded perspective view of an entire configuration of the VCM of FIG. 1.
Figure 3:
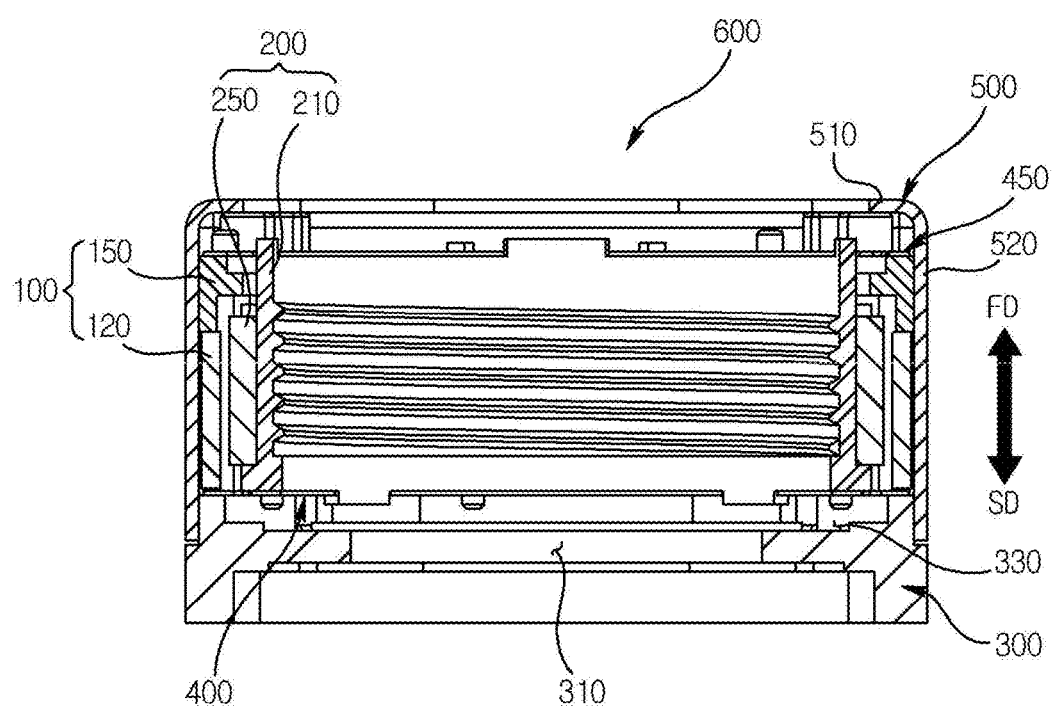
FIG. 3 is an assembled cross-sectional view of FIG. 2.

FIG. 1 is a schematic cross-sectional view illustrating a VCM according to a first exemplary embodiment of the present disclosure, FIG. 2 is an exploded perspective view of an entire configuration of the VCM of FIG. 1, and FIG. 3 is an assembled cross-sectional view of FIG. 2.

Referring to FIGS. 1, 2 and 3, a voice coil motor (hereinafter referred to as VCM, 600) may include a stator (100), a rotor (200), a base (300) and an elastic member (400). In addition, the VCM (600) may further include a cover (500).

The stator (100) includes a first driving unit (120) and a housing (150). The stator (100) generates a magnetic field for driving the rotor (200, described later). The first driving unit (120) may include a coil block formed by winding a long wire insulated by an insulation resin in a cylindrical shape, for example. In a case where a voltage having a voltage difference is applied to the first driving unit (120) including the coil block formed by winding a long wire insulated by an insulation resin in a cylindrical shape, a first magnetic field is generated from the first driving unit (120) where a direction of the first driving unit (120) is changed in response to a direction of a current flowing in the first driving unit (120).

Although the exemplary embodiment of the present disclosure has illustrated and explained a case where the first driving unit (120) of the stator (100) is a coil block, the first driving unit (120) may include a magnet capable of generating a magnetic field.

The housing (150) fixes the first driving unit (120). The housing (150) may include a housing body (152) and pillars (154), for example. The housing body (152) takes a shape of a rectangular plate, for example, and is centrally formed with an opening (153) exposing a lens mounted on a bobbin (described later). The housing body (152) is formed at an upper surface thereof with a plurality of bosses (156) for fixing an elastic member (described later). Each pillar (154) is protruded from each corner (four corners) of a bottom surface of the housing body (152) opposite to the base (300).

An inner surface of the first driving unit (120) including the coil block is fixed to an outer surface of the pillars (154). The pillars (154) may be coupled to an upper surface of the base (300, described later).

The rotor (200) includes a bobbin (210) and a second driving unit (250). The rotor (200) moves relative to the stator (100) to adjust a gap between an image sensor (described later) arranged at a bottom surface of the base (300, described later) and a lens (205).

The bobbin (210) takes a shape of a cylinder formed with a hollow hole, and is formed at an inner surface thereof with a screw thread for fixing the lens (205). The bobbin (210) is formed at an outer surface thereof with flat fixtures (215) for fixing each of the second driving unit (250). For a non-limiting example, four fixtures (215) are formed at the outer surface of the bobbin (210) each at an equi-distance.

Each of the second driving units (250) may include a magnet generating a second magnetic field, each having a plate shape, for example, and be fixed to each fixture (215) formed at the outer surface of the bobbin (210). Each second driving unit (250) may be attached to the fixture (215) using an adhesive. Each of the second driving units (250) is opposite to the first driving unit (120) of the stator (100).

Although the exemplary embodiment of the present disclosure has illustrated and explained a case where the second driving unit (250) is a magnet, the second driving unit (250) may alternatively include a coil block formed by winding an insulated long wire.

In a non-limiting example, in a case where the first driving unit includes a coil block, the second driving unit (250) includes a magnet, and alternatively in a case where the first driving unit (120) includes a magnet, the second driving unit includes a coil block. The rotor (200) horizontally moves based on the base (300) in response to an attractive force and a repulsive force generated by the first magnetic field generated by the first driving unit (120) and generated by the second magnetic field generated by the second driving unit (250).

Meanwhile, in the exemplary embodiment of the present disclosure, the rotor (200) is distanced from an upper surface of the base (300) in a state where a driving signal is not applied to the first driving unit (120) or the second driving unit (250).

The base (300) takes a shape of a plate to fix the stator (100). The base (300) is centrally formed with an opening for passing light having passed the lens (205) embedded in the bobbin (210) of the rotor (200). Each of the four corners of the upper surface (320) of the plate-shaped base (300) is formed with a coupling pillar (325), where the coupling pillar (325) serves to couple the cover (500) and the base (300).

The base (300) is fixed at a rear surface thereof by an IR (Infrared) filter (301) generating an image corresponding to the light having passed the lens (205) of the bobbin (210) and an image sensor (not described). Meanwhile, the upper surface (320) of the plate-shaped base (300) is formed with a bobbin accommodation groove (330) concavely formed from the upper surface (320) of the base (300), where the bobbin accommodation groove (330) functions to accommodate a bottom surface of the bobbin (210).

The bobbin accommodation groove (330) is greater than an area of the bobbin (210), and the bobbin (210) and the base (300) may be partially overlapped by the bobbin accommodation groove (330). In the exemplary embodiment of the present disclosure, depth of the bobbin accommodation groove (330) may be formed in consideration of a stroke length of the rotor (200).

Meanwhile, a floor surface (335) of the base (300) formed by the bobbin accommodation groove (330) is arranged with a shock absorption member (350) formed along the opening (310) of the base (300). The shock absorption member (350) absorbs shock and vibration generated by collision between the bobbin (210) and the floor surface (335) of the base (300), for example. In the exemplary embodiment of the present disclosure, the shock absorption member (350) may include any one selected from a group consisting of a sponge, a synthetic resin having elasticity and a rubber. The shock absorption member (350) may be formed in the shape of a circular plate having a thin thickness.

In the exemplary embodiment of the present disclosure, the rotor (200) is distanced from the upper surface of the base (300) by the elastic member (400) while no driving signal is applied to the first driving unit (120) of the stator (100) and the second driving unit (250) of the rotor (200).

In a case where the rotor (200) is distanced from the upper surface of the base (300) by the elastic member (400) while no driving signal is applied to the first driving unit (120) of the stator (100) and the second driving unit (250) of the rotor (200), the rotor (200) moves to a direction distancing from the upper surface of the base (300) or to a direction approaching the upper surface of the base (300) as the driving signal is applied to any one of the first driving unit (120) of the stator (100) or the second driving unit (250) of the rotor (200), whereby intensity of current and power consumption required for driving the rotor (200) can be greatly reduced.

The elastic member (400) for distancing the rotor (200) from the upper surface of the base (300) includes a first elastic member (440) and a second elastic member (450). The elastic member (400) serves to distance the bottom surface of the bobbin (210) from the floor surface (335) formed by the bobbin accommodation groove (330) formed on the upper surface (320) of the base (300), in a case where no driving signal is applied to the second driving unit (250).

The first elastic member (440) elastically supports the bottom surface of the bobbin (210) of the rotor (200), and serves to float the bottom surface of the bobbin (210) of the rotor (200) to an upper surface of the bobbin accommodation groove (330) of the base (300). The first elastic member (440) includes a first inner elastic unit (410), a first outer elastic unit (420) and a first connection elastic unit (430).

The first inner elastic unit (410) is formed in a shape of a circular ring, for example, and is coupled to the bottom surface or a bottom end of the bobbin (210). The first inner elastic unit (410) is coupled to the bottom surface of the bobbin (210) using an adhesive or thermosetting method, for example. The first inner elastic unit (410), being coupled to the bottom surface of the bobbin (210), is formed with a size insertable into the bobbin accommodation groove (330) of the base (300).

The first outer elastic unit (420) is arranged at an outer side of the first inner elastic unit (410) and takes a shape of a square frame. The first outer elastic unit (420) is formed with a size larger than the bobbin accommodation groove (330) of the base (300), such that the first outer elastic unit (420) is arranged on the upper surface (320) of the base (300). The first outer elastic unit (420) may be fixed on the upper surface (320) of the base (300) by the pillars (154) of the housing (150) at the stator (100), for example.

The first connection elastic unit (430) elastically connects the first inner elastic unit (410) and the first outer elastic unit (420), where the first inner elastic unit (410) comes to possess elasticity by the first connection elastic unit (430). The first connection elastic unit (430) has a first spring constant (K), where the first spring constant (K) may be changed by shape, thickness, length and dimension of the first connection elastic unit (430).

Although the exemplary embodiment of the present disclosure has illustrated and explained one first elastic member (440), alternatively, the first elastic member (440) may be coupled to the bottom surface of the base (300) in a pair, each being symmetrical to the other.

The second elastic member (450) is coupled to a coupling boss (156) formed on an upper surface of the housing body (152) of the housing (150) at the stator (100). The second elastic member (450) includes a second inner elastic unit (451), a second outer elastic unit (452) and a second connection elastic unit (453).

The second inner elastic unit (451) is coupled to the upper surface of an upper end of the bobbin (210). The second outer elastic unit (452) is arranged on an upper surface of the housing body (152). The second connection elastic unit (453) serves to connect the second inner elastic unit (451) and the second outer elastic unit (452) and possesses a second spring constant (K). The second spring constant (K) of the second connection elastic unit (453) may be changed by shape, thickness, length and dimension of the second connection elastic unit (453).

The second outer elastic unit (452) arranged on the upper surface of the housing body (152) is formed with a coupling hole (455) coupled to a coupling boss (156) formed on the upper surface of the housing body (152).

Referring to FIG. 1 again, the VCM (600) may further include a cover (500). The cover (500) includes an upper plate (510) formed with an opening exposing the lens (205) of the rotor (200), and a lateral plate (520) extended to a direction facing the base (300) from an edge of the upper plate (510), where the lateral plate (520) is coupled to a lateral surface of the base (300).

Referring to FIG. 1 again, the bobbin (210) of the rotor (200) according to an exemplary embodiment of the present disclosure may be driven to a first direction (FD) distancing from the upper surface (320) of the base (300) by a force generated by the first and second driving units (120, 250), and a second direction (SD) facing a floor surface of the bobbin accommodation groove (330) of the base (300) in an opposite direction from the first direction (FD). The bobbin (210) of the rotor (200) according to an exemplary embodiment of the present disclosure is driven to the first direction (FD), in a case where a forward current is applied to the first driving unit (120), and to the second direction (SD) in an opposite direction of the first direction (FD), in a case where a reverse current opposite to the forward current is applied to the first driving unit (120).

At this time, the forward current or reverse current applied to the first driving unit (120) may be realized by adjusting a voltage difference applied to distal ends of the first driving unit (120). The rotor (200) of the VCM (600) illustrated in FIGS. 1, 2 and 3 is arranged to a direction perpendicular to a ground surface without tilting, in a state where the optical axis of the lens (205) is arranged perpendicular to the ground surface (or on a horizontal surface of the ground surface), that is, the VCM (600) lies flat (or on a horizontal surface of) to the ground surface.

However, the VCM (600) may be arranged in various directions, in a case where a user photographs an object using a smart phone mounted with the VCM (600). In a non-limiting example, in a case where the optical axis of the lens (205) mounted on the rotor (200) of the VCM (600) is arranged to face a direction parallel with the ground surface (or horizontal surface), the rotor (200) is applied with a moment in response to the gravity center of the rotor (200) and gravity, whereby the rotor (200) may be generated with a tilt.

In the exemplary embodiment of the present disclosure, the VCM (600) restricts or inhibits the tilt of the rotor (200) generated by change in posture or change in arrangement based on a reference surface (ground surface or horizontal surface).

In order to restrict or inhibit the tilt of the rotor (200) generated by change in posture or change in arrangement, each of the first and second elastic members (440, 450) of the elastic member (400) elastically supporting the rotor (200) has a mutually different spring constant (K) relative to the gravity center of the rotor (200).

Although the exemplary embodiment of the present disclosure has illustrated and explained that each of the first and second elastic members (440, 450) of the elastic member (400) elastically supporting the rotor (200) has a mutually different spring constant (K) relative to the gravity center of the rotor (200), it should be apparent to the skilled in the art that each of the first and second elastic members (440, 450) of the elastic member (400) elastically supporting the rotor (200) has a mutually different elastic modulus (E) relative to the gravity center of the rotor (200).

Figure 4:
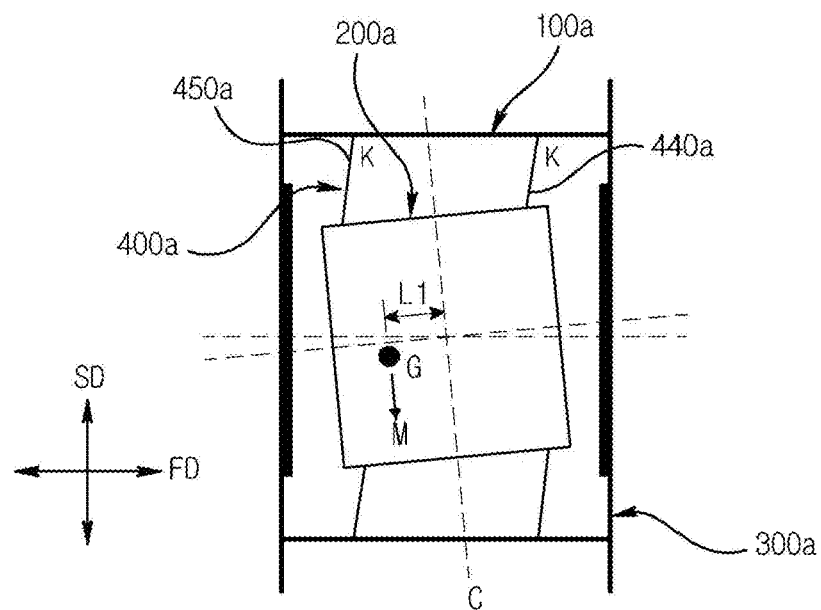
FIG. 4 is a cross-sectional view illustrating a VCM based on a comparative example in contrast to the VCM according to the first exemplary embodiment of the present disclosure.

FIG. 4 is a cross-sectional view illustrating a VCM based on a comparative example in contrast to the VCM according to the first exemplary embodiment of the present disclosure.

Referring to FIG. 4, a rotor (200a) is coupled to a stator (100a) by elastic members (440a, 450a, 400a), and the rotor (200a) is distanced from an upper surface of a base (300a), in a case where no driving signal is applied. In the comparative example, the first elastic member (440a) and the second elastic member (450a) of the elastic member (400a) have the same spring constant (K) and same elastic modulus (E). Furthermore, in the comparative example, a gravity center (G) of the rotor (200a) is formed at a position distanced as much as a length (L1) toward an upper end of the rotor (200a) based on a center (C) of the rotor (200a).

In the comparative example, in a case where an optical axis of the rotor (200a) of the VCM (600a) is arranged in parallel with the ground surface, that is, in a case where the elastic member (400a) is arranged to a second direction (SD) which is perpendicular to the ground surface, the gravity center (G) of the rotor (200a) is generated with a moment (M) by self-weight of the rotor (200a), where the rotor (200a) is tilted by the moment (M) generated to a clockwise direction.

In the comparative example, the tilting of the rotor (200a) inhibits an optical axis of a lens from being in line with an optical axis of an image sensor, whereby a serious image defects may be generated.

Figure 5:
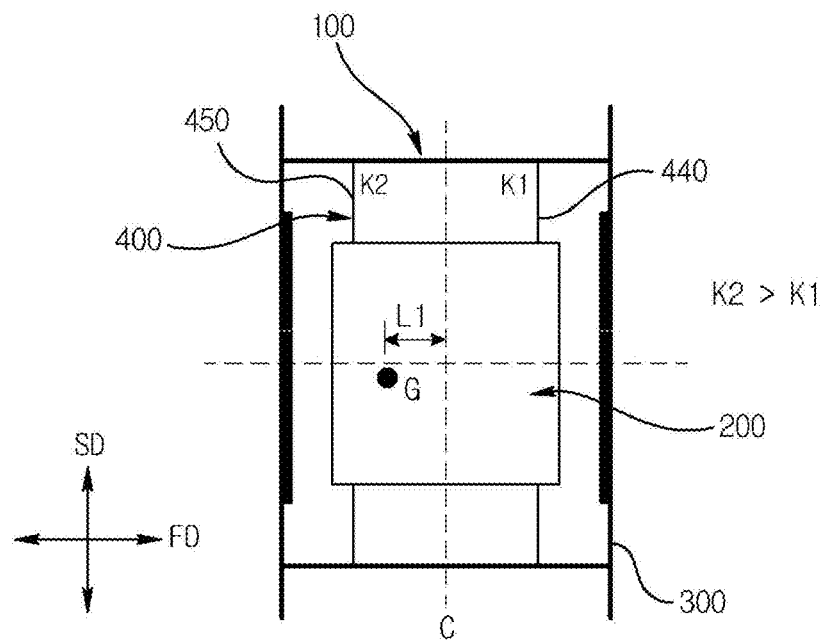
FIG. 5 is a cross-sectional view illustrating the VCM in contrast to the comparative example of FIG. 4 according to the first exemplary embodiment of the present disclosure.

FIG. 5 is a cross-sectional view illustrating the VCM in contrast to the comparative example of FIG. 4 according to the first exemplary embodiment of the present disclosure.

Referring to FIG. 5, a rotor (200) is coupled to a stator (100) by elastic members (440, 450, 400), where the rotor is distanced from an upper surface of the base (300a), in a case where no driving signal is applied. Each of the first and second elastic members (440, 450) of the elastic member (400) has a mutually different spring constant (K). Furthermore, a gravity center (G) of the rotor (200) is formed at a position distanced as much as a length (L1) toward an upper end of the rotor (200) based on a center (C) of the rotor (200a).

Although the gravity center (G) of the rotor (200) is generated with a moment (M) by self-weight of the rotor (200), in a case where an optical axis of the rotor (200) of the VCM (600) is arranged in parallel with the ground surface, that is, in a case where the elastic member (400a) is arranged to a second direction (SD) which is perpendicular to the ground surface, the rotor (200) is not generated in an exemplary embodiment of the present disclosure with a tilt by the moment unlike the comparative example of FIG. 4. This is because each of the first and second elastic members (440, 450) of the elastic member (400) has a mutually different spring constant (K) as explained before.

To be more specific, in a case where the gravity center (G) of the rotor (200) is formed close to the second elastic member (450) based on the center (C) of the rotor (200), the first elastic member (440) has the first spring constant (K1), whereas the second elastic member (450) has a second spring constant (K2) greater than the first spring constant (K1) of the first elastic member (440) in order to inhibit the rotor from being tilted through compensation of moment.

The second spring constant (K2) in the exemplary embodiment of the present disclosure has an appropriate value adequate to compensate the moment capable of tilting the rotor (200), whereby the second spring constant (K2) may increase in proportion to the length (L1) between the center (C) of the rotor (200) and the gravity center (G) of the rotor (200). Alternatively, it should be apparent that the first spring constant (K1) of the first elastic member (440) may decrease in reverse proportion to the second spring constant (K2).

The first elastic member (440) may be formed with a first area, and the second elastic member (450) may be formed with a second area, in order to allow the first elastic member (440) to have the first spring constant (K1), and the second elastic member (450) to have a second spring constant (K2) greater than the first spring constant (K1) of the first elastic member (440).

Furthermore, the first connection elastic unit (430) of the first elastic member (440) is formed with a first length, and the second connection elastic unit (453) of the second elastic member (450) is formed with a second length longer than the first length to allow the first elastic member (440) to have the first spring constant (K1), and the second elastic member (450) to have a second spring constant (K2) greater than the first spring constant (K1) of the first elastic member (440).

Still furthermore, the first connection elastic unit (430) of the first elastic member (440) and the second connection elastic unit (453) of the second elastic member (450) may be formed with a mutually different shape to allow the first elastic member (440) to have the first spring constant (K1), and the second elastic member (450) to have a second spring constant (K2) greater than the first spring constant (K1) of the first elastic member (440).

Figure 6:
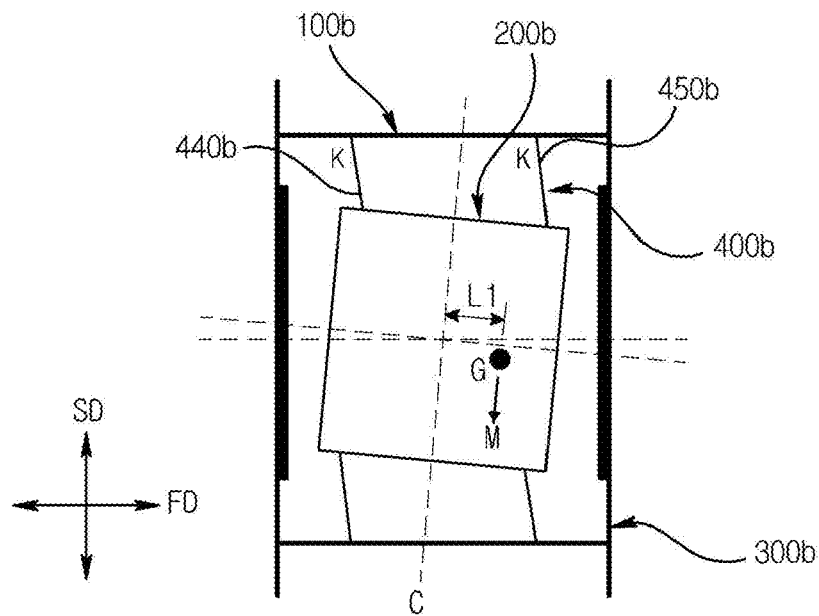
FIG. 6 is a cross-sectional view illustrating a VCM based on a second comparative example in contrast to the VCM according to the first exemplary embodiment of the present disclosure.

FIG. 6 is a cross-sectional view illustrating a VCM based on a second comparative example in contrast to the VCM according to the first exemplary embodiment of the present disclosure.

Referring to FIG. 6, a rotor (200b) is coupled to a stator (100b) by elastic members (440b, 450b, 400b), where the rotor (200b) is distanced from an upper surface of a base (300b), in a case where no driving signal is applied.

Each of the first elastic member (440b) and the second elastic member (450b) of the elastic member (400b) in the second comparative example has a same elastic modulus (E) and same spring constant (K). Furthermore, a gravity center (G) of the rotor (200b) is formed at a position distanced as much as a length (L1) toward an upper end of the rotor (200b) based on a center (C) of the rotor (200b) in the second comparative example.

In the second comparative example, in a case where an optical axis of the rotor (200b) of the VCM (600b) is arranged in parallel with the ground surface, that is, in a case where the elastic member (400b) is arranged to a second direction (SD) which is perpendicular to the ground surface, the gravity center (G) of the rotor (200b) is generated with a moment (M) by self-weight of the rotor (200b), where the rotor (200b) is tilted by the moment (M) generated to a counterclockwise direction.

In the second comparative example, the tilting of the rotor (200b) inhibits an optical axis of a lens from being in line with an optical axis of an image sensor, whereby a serious image defects may be generated due to the rotor (200b) being tilted to a counterclockwise direction.

Figure 7:
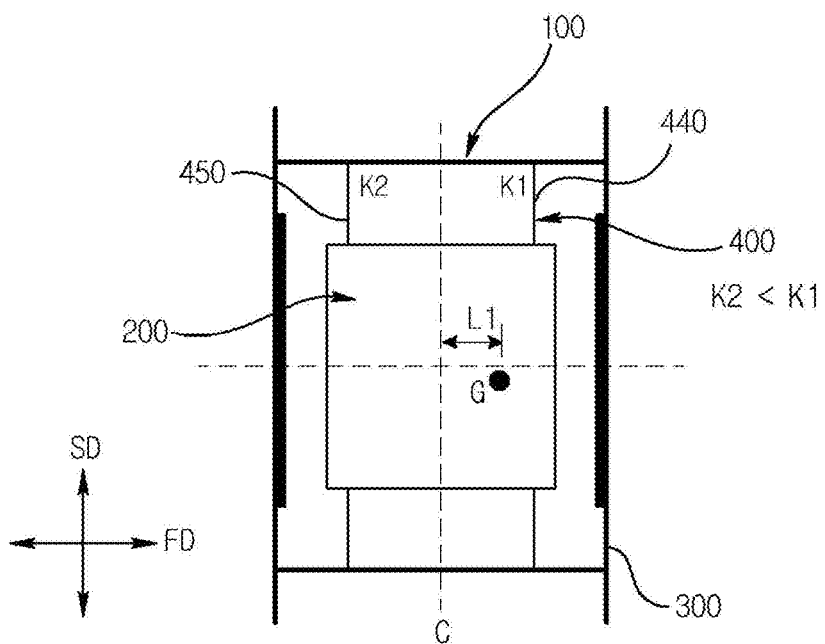
FIG. 7 is a cross-sectional view illustrating a VCM based on the second comparative example of FIG. 6 in contrast to the VCM according to the first exemplary embodiment of the present disclosure.

FIG. 7 is a cross-sectional view illustrating a VCM based on the second comparative example of FIG. 6 in contrast to the VCM according to the first exemplary embodiment of the present disclosure.

Referring to FIG. 7, a rotor (200) is coupled to a stator (100) by elastic members (440, 450, 400), where the rotor (200) is distanced from an upper surface of a base (300), in a case where no driving signal is applied.

Each of the first elastic member (440) and the second elastic member (450) of the elastic member (400) has a mutually different spring constant (K). Furthermore, a gravity center (G) of the rotor (200) is formed at a position distanced as much as a length (L1) toward a bottom end of the rotor (200) based on a center (C) of the rotor (200b) as in the second comparative example.

In a case where an optical axis of the rotor (200) of the VCM (600) is arranged in parallel with the ground surface, that is, in a case where the elastic member (400) is arranged to a second direction (SD) which is perpendicular to the ground surface, the gravity center (G) of the rotor (200) is generated with a moment (M) by self-weight of the rotor (200), but no tilt is generated with the rotor (200) unlike the comparative example of FIG. 6.

This is because each of the first and second elastic members (440, 450) of the elastic member (400) has a mutually different spring constant (K) as explained before in order to inhibit the rotor (200) from being tilted by the gravity center (G) of the rotor (200).

To be more specific, in a case where the gravity center (G) of the rotor (200) is formed close to the second elastic member (450) based on the center (C) of the rotor (200), the second elastic member (450) has the first spring constant (K1), whereas the first elastic member (440) has a second spring constant (K2) greater than the first spring constant (K1) of the second elastic member (450) in order to inhibit the rotor from being tilted through compensation of moment.

The second spring constant (K2) of the first elastic member (440) in the exemplary embodiment of the present disclosure has an appropriate value adequate to compensate the moment (M) capable of tilting the rotor (200), whereby the second spring constant (K2) may increase in proportion to the length (L1) between the center (C) of the rotor (200) and the gravity center (G) of the rotor (200). Alternatively, it should be apparent that the first spring constant (K1) of the second elastic member (450) may decrease in reverse proportion to the second spring constant (K2).

The first elastic member (440) may be formed with a first area, and the second elastic member (450) may be formed with a second area smaller than the first area, in order to allow the second elastic member (450) to have the first spring constant (K1), and the first elastic member (440) to have a second spring constant (K2) greater than the first spring constant (K1).

Furthermore, the first connection elastic unit (430) of the first elastic member (440) is formed with a first length, and the second connection elastic unit (453) of the second elastic member (450) is formed with a second length longer than the first length to allow the first elastic member (440) to have the first spring constant K1), and the second elastic member (450) to have a second spring constant (K2) greater than the first spring constant (K1).

Still furthermore, the first connection elastic unit (430) of the first elastic member (440) and the second connection elastic unit (453) of the second elastic member (450) may be formed with a mutually different shape to allow the second elastic member (450) to have the first spring constant (K1), and the first elastic member (440) to have a second spring constant (K2) greater than the first spring constant (K1).

Although the abovementioned description has disclosed a technical characteristic in which the spring constant (K) of the first and second elastic members (440, 450) coupled to an upper end and a bottom end of the rotor is individually adjusted in order to inhibit the rotor from being tilted, alternatively it should be apparent that the elastic modulus (E) intrinsic to the first and second elastic members (440, 450) may be changed to inhibit the rotor from being tilted.

As apparent from the foregoing, the VCM according to the present disclosure has an is advantageous effect in that a bobbin mounted with a lens is floated from a bobbin accommodation groove formed on an upper surface of a base mounted with an image sensor to bi-directionally drive the rotor to a direction distancing from the base or to a direction approaching the base, whereby the VCM can be driven with a low current, and whereby power consumption can be reduced to adjust a focus between the lens and the image sensor within a quick time, and whereby a contact noise caused by driving of the bobbin can be reduced, and whereby the rotor is inhibited from being tilted by a gravity center of the rotor distanced from the base to enhance the quality of an image.

Second Exemplary Embodiment

Figure 8:
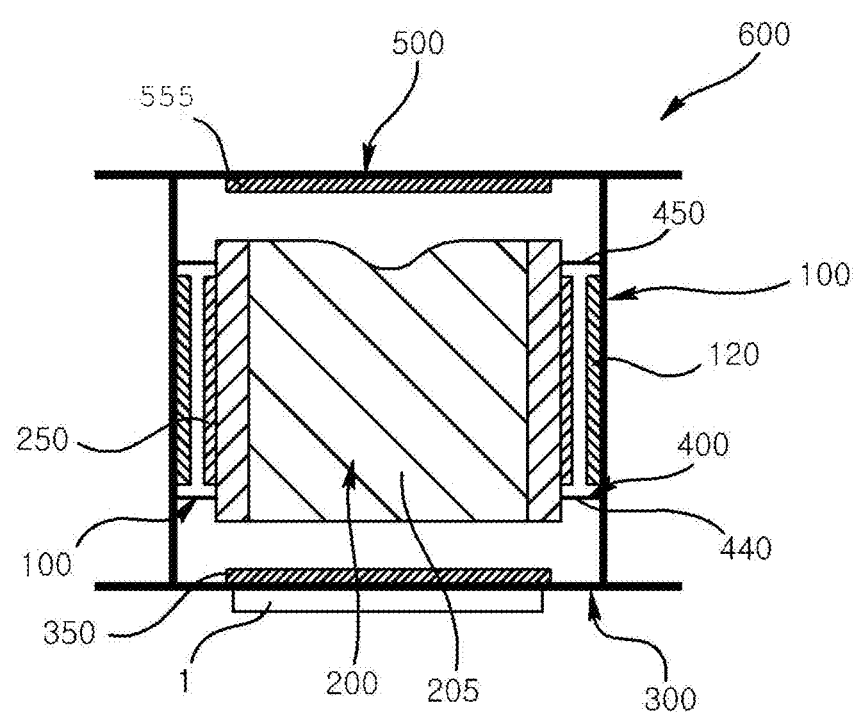
FIG. 8 is a schematic cross-sectional view illustrating a VCM according to a second exemplary embodiment of the present disclosure.

FIG. 8 is a schematic cross-sectional view illustrating a VCM according to a second exemplary embodiment of the present disclosure.

Referring to FIGS. 1, 2 and 8, a voice coil motor (hereinafter referred to as VCM, 600) may include a stator (100), a rotor (200), a base (300) and an elastic member (400). In addition, the VCM (600) may further include a cover (500).

The stator (100) includes a coil block (120) and a housing (150). The stator (100) generates a magnetic field for driving the rotor (200, described later). Alternatively, the stator (100) may include a magnet generating a magnetic field, and the housing (150).

The coil block (120) may be formed by winding a long wire insulated by an insulation resin in a cylindrical shape, for example. In a case where a voltage having a voltage difference is applied to the coil block (120) formed by winding a long wire insulated by an insulation resin in a cylindrical shape, a magnetic field is generated from the coil block (120) where a direction of the magnetic field is changed in response to a direction of a current flowing in the coil block (120).

The housing (150) fixes the coil block (120). The housing (150) may include a housing body (152) and pillars (154), for example. The housing body (152) takes a shape of a rectangular plate, for example, and is centrally formed with an opening (153) exposing a lens mounted on a bobbin (described later). The housing body (152) is formed at an upper surface thereof with a plurality of bosses (156) for fixing an upper elastic member (described later). Each pillar (154) is protruded from each corner (four corners) of a bottom surface of the housing body (152) opposite to the base (300).

An inner surface of the coil block (120) is fixed to an outer surface of the pillars (154). The pillars (154) may be coupled to an upper surface of the base (300, described later).

The coil block (120), in a wound state of a cylinder shape, may be attached to the pillars (154) of the housing (150) using an adhesive, or may be directly wound on the pillars (154) of the housing (150).

The rotor (200) includes a bobbin (210) and a magnet (250). In a case where the stator (100) includes the coil block (120) in the exemplary embodiment of the present disclosure, the rotor (200) includes the magnet (250), and in a case where the stator includes the magnet, the rotor (200) includes the coil block.

The rotor (200) is driven to a first direction approaching the base (300), or to a second direction distancing from the base (300). The bobbin (210) is fixed by a cylinder-shaped lens (205). The rotor (200) moves relative to the stator (100) to adjust a gap between an image sensor (described later) arranged at a bottom surface of the base (300, described later) and a lens (205).

The bobbin (210) takes a shape of a cylinder formed with a hollow hole, for example, and is formed at an inner surface thereof with a screw thread for fixing the lens (205). The bobbin (210) is formed at an outer surface thereof with magnet fixtures (215) for fixing a plurality of magnets (250). For a non-limiting example, four magnet fixtures (215) are formed at the outer surface of the bobbin (210), each at an equi-distance.

Each of the magnets (250) may take a shape of a plate, for example, and be fixed to each magnet fixture (215) formed at the outer surface of the bobbin (210). Each magnet (250) may be attached to the magnet fixture (215) using an adhesive. Each of the magnets (250) is arranged opposite to the coil block (120) of the stator (100).

The base (300) takes a shape of a cubic plate, for example, to fix the stator (100). The base (300) is centrally formed with an opening for passing light having passed the lens (205) embedded in the bobbin (210) of the rotor (200). Each of the four corners of an upper surface (320) of the plate-shaped base (300) is formed with coupling pillars (325), where each of the coupling pillar (325) serves to couple the cover (500, described later) and the base (300).

The base (300) is fixed at a rear surface thereof by an IR (Infrared) filter (301) generating an image corresponding to the light having passed the lens (205) of the bobbin (210) and an image sensor (not described). Meanwhile, the upper surface (320) of the plate-shaped base (300) is formed with a bobbin accommodation groove (330) concavely formed from the upper surface (320) of the base (300), where the bobbin accommodation groove (330) functions to accommodate a bottom surface of the bobbin (210).

The bobbin accommodation groove (330) is greater than an area of the bobbin (210), and the bobbin (210) and the base (300) may be partially overlapped by the bobbin accommodation groove (330). In the exemplary embodiment of the present disclosure, depth of the bobbin accommodation groove (330) may be formed in consideration of a stroke length of the rotor (200).

Meanwhile, a floor surface (335) of the base (300) formed by the bobbin accommodation groove (330) is arranged with a shock absorption member (350) formed along the opening (310) of the base (300). The shock absorption member (350) absorbs shock generated by collision between the bobbin (210) and the floor surface (335) of the base (300), for example. In the exemplary embodiment of the present disclosure, the shock absorption member (350) may include any one selected from a group consisting of a sponge, a synthetic resin having elasticity and a rubber. The shock absorption member (350) may be formed in the shape of a circular plate having a thin thickness.

A first elastic member (440) of an elastic member (400) elastically supports the bobbin (210) of the rotor (200), and serves to float the bottom surface of the bobbin (210) of the rotor (200) to an upper surface of the bobbin accommodation groove (330) of the base (300).

That is, the first elastic member (440) forms a gap between the bottom surface of the bobbin (210) and a floor surface (335) formed by the bobbin accommodation groove (330) formed on the upper surface (320) of the base (300) regardless of posture of the bobbin (210), in a case no current is applied to the coil block (120). At this time, the posture of the bobbin (210) means that the lens of the bobbin (210) faces downwards, faces upwards or is arranged in parallel with a ground surface.

The first elastic member (440) includes a first inner elastic unit (410), a first outer elastic unit (420) and a first connection elastic unit (430).

The first inner elastic unit (410) is formed in a shape of a circular ring, for example, and is coupled to the bottom surface or a bottom end of the bobbin (210). The first inner elastic unit (410) is coupled to the bottom surface of the bobbin (210) using an adhesive or thermosetting method, for example. The first inner elastic unit (410), being coupled to the bottom surface of the bobbin (210), is formed with a size insertable into the bobbin accommodation groove (330) of the base (300).

The first outer elastic unit (420) is arranged at an outer side of the first inner elastic unit (410) and takes a shape of a square frame. The first outer elastic unit (420) is formed with a size larger than the bobbin accommodation groove (330) of the base (300), such that the first outer elastic unit (420) is arranged on the upper surface (320) of the base (300). The first outer elastic unit (420) may be fixed on the upper surface (320) of the base (300) by the pillars (154) of the housing (150) at the stator (100), for example.

The first connection elastic unit (430) elastically connects the first inner elastic unit (410) and the first outer elastic unit (420), where the first inner elastic unit (410) comes to possess elasticity by the first connection elastic unit (430).

The bobbin (210) in an exemplary embodiment of the present disclosure is floated on an upper surface of the bobbin accommodation groove (330) of the base (300) by the first elastic member (440).

The first inner elastic unit (410) is distanced from a floor surface (335) formed by the bobbin accommodation groove (330), and the first inner elastic unit (410), the first outer elastic unit (420), and the first connection elastic unit (430) may be arranged on a same planar surface, in a case where no driving signal is applied to the coil block (120). Alternatively, the first inner elastic unit (410) may be arranged at a position a bit lower than that of the first outer elastic unit (420), in a case where no driving signal is applied to the coil block (120).

In an exemplary embodiment of the present disclosure, formation of the bobbin accommodation groove (330) concavely formed on the upper surface (320) of the base (300) may reduce an entire volume of the VCM (600), where the rotor (200) can be driven to a first direction facing the base (300), or to a direction distancing from the base (300). That is, the rotor (200), in case of being distanced from the upper surface (320) of the base (300), may be driven to the first direction facing the base (300), or to the direction distancing from the base (300) in response to changes in direction of a current applied to the coil block (120).

A coupling boss (156) formed on an upper surface of the housing body (152) of the housing (150) is coupled by a second elastic member (450). The second elastic member (450) includes a second inner elastic unit (451), a second outer elastic unit (452) and a second connection elastic unit (453).

The second inner elastic unit (451) is coupled to the upper surface of the bobbin (210). The second outer elastic unit (452) is arranged on an upper surface of the housing body (152). The second connection elastic unit (453) serves to connect the second inner elastic unit (451) and the second outer elastic unit (452). The second outer elastic unit (452) arranged on the upper surface of the housing body (152) is formed with a coupling hole (455) coupling with a coupling boss (156) formed on the upper surface of the housing body (152).

Referring to FIG. 1 again, the VCM (600) may further include a cover (500). The cover (500) includes an upper plate (510) formed with an opening exposing the lens (205) of the rotor (200), and a lateral plate (520) extended to a direction facing the base (300) from an edge of the upper plate (510), where the lateral plate (520) is coupled to a lateral surface of the base (300).

Referring to FIG. 2 again, the bobbin (210) of the rotor (200) according to an exemplary embodiment of the present disclosure may be driven to a first direction facing the upper surface (320) of the base (300) and a second direction distancing from the base (300) in an opposite direction from the first direction in response to a force generated by the coil block (120) and the magnet (250). A forward current or a backward current applied to the coil block (120) may be realized by adjusting a voltage difference applied to both ends of the coil block (120). The voltage difference may be implemented by, for example, a PWM circuit.

Figure 9:
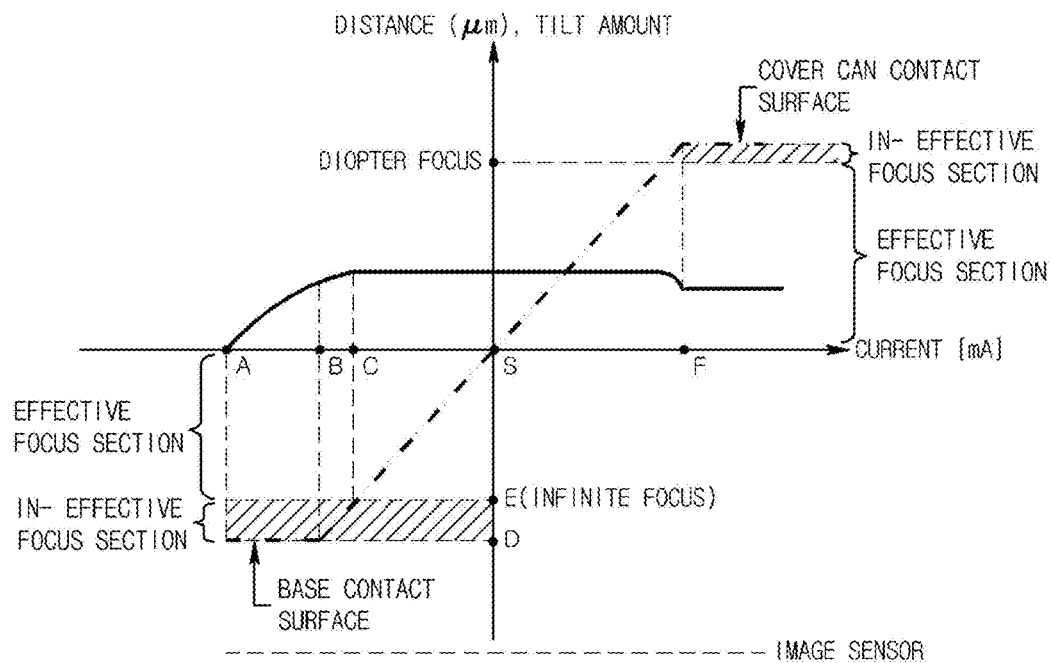
FIG. 9 is a graph illustrating a current-distance characteristic and a current-tilt amount characteristic of a rotor of FIG. 8.

FIG. 9 is a graph illustrating a current-distance characteristic and a current-tilt amount characteristic of a rotor of FIG. 8.

Referring to FIGS. 8 and 9, a voice coil motor (hereinafter referred to as VCM, 600) may include a stator (100), a rotor (200), a base (300), an elastic member (400), and a cover (500).

The base (300) takes a shape of a plate and is centrally formed with an opening for passing light, where the base (300) functions as a bottom stopper of the rotor (200). The base (300) may be formed at an upper surface with an accommodation groove accommodating a bottom surface of the rotor (200) for distancing an upper surface of the base (300) from a bottom surface of the rotor (200). The base (300) is formed at the upper surface with a shock absorption member (350) inhibiting noise generated by collision between the rotor (200) and the base (300). In the exemplary embodiment of the present disclosure, the shock absorption member (350) may include any one selected from a group consisting of a sponge, a synthetic resin having elasticity and a rubber.

The base (300) may be arranged at a rear surface of a rear end with an image sensor (1) which in turn changes a light incident from the rotor (200) to a digital image or a video. The stator (100) is secured on the base (300), includes a coil block (120) which is a first driving unit for generating a magnetic field, and is formed therein with an accommodation space.

The coil block (120) which is a first driving unit a coil formed by winding a long wire insulated by an insulation resin in a cylindrical shape for generating a magnetic field in response to a current. The rotor (200) is arranged inside the stator (100), and includes a lens (205). The rotor (200) is mounted at an outer surface thereof with a magnet including a second driving unit generating a magnetic field.

In an exemplary embodiment of the present disclosure, in a case the first driving unit of the stator (100) includes the coil block (120), the second driving unit of the rotor (200) may include a magnet (250). Alternatively, the first driving unit of the stator (100) may include a magnet, and the second driving unit may include a coil block, in a case the first driving unit of the stator (100) includes a magnet.

An elastic member (400) is fixed at one side thereof to the rotor (200), and is fixed at the other side opposite to the one side to the stator (100), and elastically supports the rotor (200). The elastic member (400) in an exemplary embodiment of the present disclosure may include a first elastic member (440) formed at a bottom end of an outer surface of the rotor (200) and a second elastic member (450) formed at an upper end of the outer surface of the rotor (200 first and second elastic members (440, 450) comprising the elastic member (400) is distanced from the upper surface of the base (300), in a case no power is applied to the coil block (120) of the stator (100), where no offset (staircase sill) is formed on the first and second elastic members (440, 450).

The elastic member (400) distances the rotor (200) from the upper surface of the base (300), in a case where no driving signal is applied to the coil block (120) generating a magnetic field.

The cover (500) is secured to the base (300), and wraps the stator (100) and the rotor (200). The cover (500) also serves as an upper stopper stopping the rotor (200). The cover (500) is arranged with a shock absorption member (350) inhibiting noise generated by collision between the rotor (200) and the cover (500). In the exemplary embodiment of the present disclosure, the shock absorption member (350) may include any one selected from a group consisting of a sponge, a synthetic resin having elasticity and a rubber.

Referring to FIGS. 8 and 9 again, the rotor (200) of the VCM (600) moves between an upper surface of the base (300) and an inner surface of the cover (500) in response to a current applied to the coil block (120).

Hereinafter, a gap between the upper surface of the base (300) acting as a bottom stopper of the rotor (200) of the VCM (600) and the inner surface of the cover (500) acting as an upper stopper of the rotor (200) is defined as a 'moving section'.

That is, the moving section may be defined as a section between a contact surface between the rotor (200) and the base (300) and a contact surface between the rotor (200) and the cover (500).

In order to realize a particular focus on the image sensor (1) by driving the rotor (200) of the VCM (600) illustrated in FIG. 9, an initial driving signal (S) of 0 [mA] to a driving signal of A [mA] must be first applied to the coil block (120) of the stator (100), whereby the rotor (200) moves to a first direction facing the upper surface of the base (300) and contacts the upper surface of the base (300). After the rotor (200) is brought into contact with the upper surface of the base (300), the coil block (120) which is the first driving unit of the rotor (200) is in turn provided with a current continuously increasing less than from A [mA] to B [mA].

However, even if a current continuously increasing less than from A [mA] to B [mA] is continuously provided, the rotor (200) is not distanced from the upper surface of the base (300). This is because an electromagnetic force acting between the coil block (120) of the first driving unit and the magnet of second driving unit is smaller than an elastic force of the elastic member (400) and/or a self-weight of the rotor (200), in a case where a current less than B [mA] is applied to the coil block (120) of the first driving unit at the stator (100).

Figure 10:
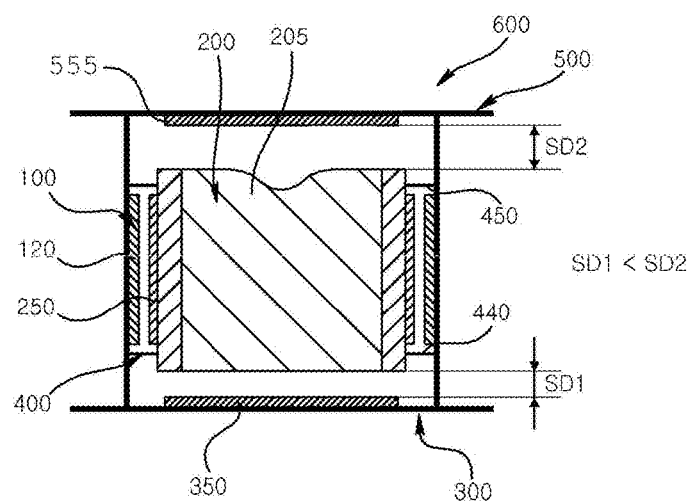
FIG. 10 is a schematic cross-sectional view illustrating a VCM according to a third exemplary embodiment of the present disclosure.

Meanwhile, with reference to a tilt graph of the rotor (200) indicated in a solid line of FIG. 10, the rotor (200) is generated with a severe trembling or a tilt, in a case where a current continuously increasing less than from A [mA] to B [mA] is continuously provided to the coil block (120) of the stator (100). The trembling or a tilt of the rotor (200) is greatest, in a case where a current is larger than B [mA] and less than C [mA].

However, the rotor (200) is not generated with trembling or a tilt, in a case where a current is larger than C [mA] is applied to the coil block (120) which is a first driving unit. Thus, a current applied to the coil block (120) corresponding to a section where an unstable tilt is generated to the rotor (200) is a current between A [mA] and C [mA], in a case where an infinite focus is formed in the exemplary embodiment of the present disclosure.

The rotor (200) is brought into contact (D) with the upper surface of the base (300), in a case where a current less than A [mA] to B [mA] is applied to the coil block (120) of the stator (100). The rotor (200) is distanced from the upper surface of the base (300) to be positioned at an E position, which is a distance axis of the graph, in a case where a current smaller than C [mA] is applied to the coil block (120) which is the first driving unit.

Now, in an exemplary embodiment of the present disclosure, a D-E section which generates a trembling or a tilt of the rotor (200) is defined as an "ineffective focus section", and a section above E section where no trembling or tilt of the rotor (200) is generated as an "effective focus section". The effective focus section is formed in the moving section of the rotor (200), while the ineffective focus section is formed at both sides of the effective focus section.

In a case where a particular focus, e.g., an infinite focus, is formed inside the ineffective focus section, a severe trembling or tilt may be generated from the rotor (200) when photographing an object in an infinite focus, such that in the exemplary embodiment of the present disclosure, no focusing operation is performed in the ineffective focus section, and a focusing operation is performed at an effective focus section above E section in the graph.

In the exemplary embodiment of the present disclosure, the infinite focus is not formed at the ineffective focus section but formed at the effective focus section. In the exemplary embodiment of the present disclosure, the ineffective focus section where trembling or tilt is generated from the rotor (200) may start from a position distanced approximately 5 μm~20 μm from the upper surface of the base (300), for example.

Furthermore, the infinite focus in the exemplary embodiment of the present disclosure is formed at a position distanced approximately 10 μm from the upper surface of the base (300), whereby no trembling or tilt of the rotor (200) can be generated to form an infinite focus.

Meanwhile, because the ineffective focus section, where trembling or tilt of the rotor (200) can be generated as in the infinite focus, reaches down to a place spaced apart at a predetermined distance from an inner surface of the cover (500) during formation of diopter (close-up) focus, the diopter focus is formed at an effective focus section distanced approximately 5 μm~20 μm from the inner surface of the cover (500) opposite to the lens (205).

In a case the rotor (200) reaches a position forming the diopter focus in the exemplary embodiment of the present disclosure, a current F [mA] applied to the coil block (120) may be approximately 20 [mA], for example.

Conclusively, the effective focus section in the exemplary embodiment of the present disclosure exists within the moving section of the rotor (200), the effective focus section is formed at a position distanced approximately 5 μm~20 μm from the upper surface of the base (300), and the effective focus section is coupled to the base (300) and formed at a position distanced approximately 5 μm~20 μm from the inner surface of the cover (500) wrapping the stator (100) and the rotor (200).

Furthermore, a distal end of the effective focus section adjacent to the base (300) is formed with an infinite focus, and a distal end of the effective focus section adjacent to the cover (500) is formed with a diopter (close-up) focus.

Although the exemplary embodiment of the present disclosure has illustrated and explained that the first driving unit of the stator (100) includes the coil block (120), and the second driving unit of the rotor (200) is a magnet (250), it should be alternatively apparent that the first driving unit of the stator (100) includes the magnet (250), and the second driving unit of the rotor (200) includes the coil block (120).

Meanwhile, a tilt amount of the rotor (200) at the effective focus section and the ineffective focus section is changed in response to a current amount applied to the coil block (120), and trembling amount and/or tilt amount of the rotor (200) in the effective focus section included in the moving section of the rotor (200) in the exemplary embodiment of the present disclosure are/is within the moving section, and smaller than a trembling amount and/or tilt amount of the rotor (200) at the ineffective focus section formed at both sides of the effective focus section.

Although the rotor (200) at the effective focus section in the exemplary embodiment of the present disclosure possesses a minute (very small) trembling amount or a minute tilt amount, the tilt amount in the effective focus section may be defined as substantially nil (zero), because the trembling amount and/or tilt amount of the rotor (200) in the effective focus section is small enough as to be negligible compared with those and/or that in the ineffective focus section.

As apparent from the abovementioned description, no infinite focus or diopter (close-up) focus is formed at an unstable section where the trembling or tilt of the rotor is generated due to mixture of electromagnetic force and elastic force around the rotor, whereas the infinite focus or diopter (close-up) focus is formed at a stable section where the trembling or tilt of the rotor is not generated to allow the image sensor to generate a high quality image and video.

Third Exemplary Embodiment

Figure 11:
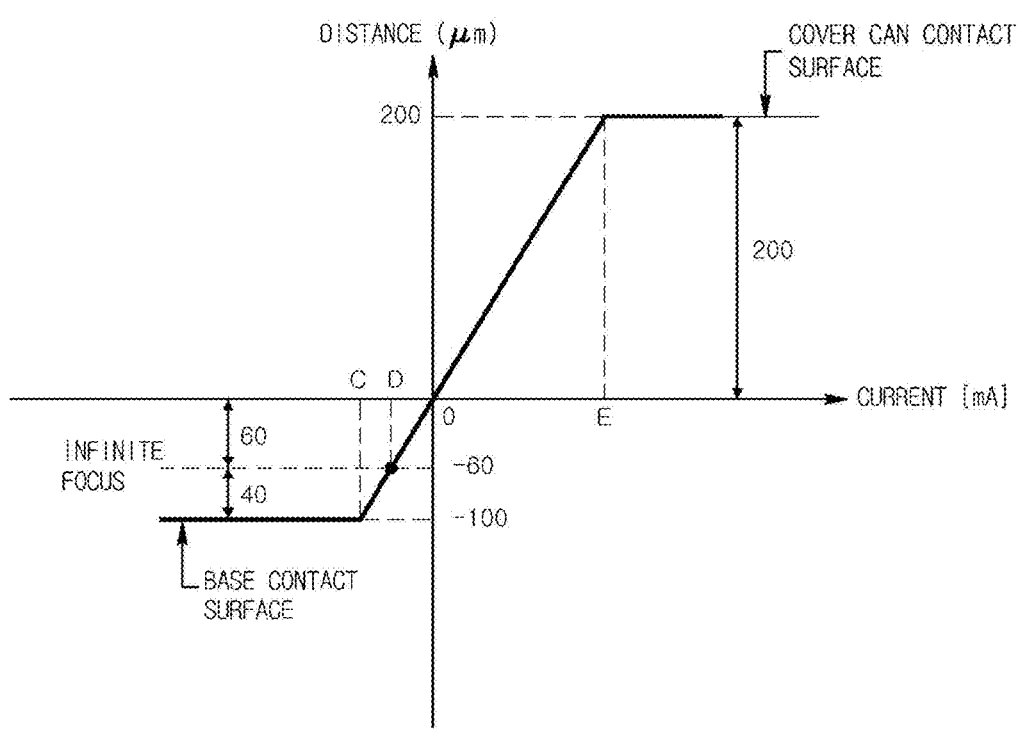
FIG. 11 is a graph illustrating a current-distance characteristic of a VCM of FIG. 8.

FIG. 10 is a schematic cross-sectional view illustrating a VCM according to a third exemplary embodiment of the present disclosure, and FIG. 11 is a graph illustrating a current-distance characteristic of a VCM of FIG. 8.

Referring to FIGS. 1, 10 and 11, a voice coil motor (hereinafter referred to as VCM, 600) may include a stator (100), a rotor (200), a base (300), an elastic member (400), and a cover (500).

The base (300) takes a shape of a plate and is centrally formed with an opening for passing light, where the base (300) functions as a bottom stopper of the rotor (200). The base (300) may be formed at an upper surface with an accommodation groove accommodating a bottom surface of the rotor (200) for distancing an upper surface of the base (300) from a bottom surface of the rotor (200). The base (300) is formed at the upper surface with a shock absorption member (350) inhibiting noise generated by collision between the rotor (200) and the base (300). In the exemplary embodiment of the present disclosure, the shock absorption member (350) may include any one selected from a group consisting of a sponge, a synthetic resin having elasticity and a rubber.

The stator (100) is secured on the base (300), the stator (100) includes a first driving unit (120) for generating a magnetic field, and the stator (100) is formed therein with an accommodation space.

The first driving unit (120) may include a coil formed by winding a long wire insulated by an insulation resin in a cylindrical shape for generating a magnetic field in response to a current. Alternatively, the first driving unit (120) may include a magnet generating a magnetic field. In the exemplary embodiment of the present disclosure, the first driving unit (120) of the stator (100) may include a coil.

The rotor (200) is arranged inside the stator (100), and includes a lens (205). The rotor (200) is mounted at an outer surface thereof with a second driving unit (250) generating a magnetic field.

In a case where the first driving unit (120) of the stator (100) includes a coil, the second driving unit (250) of the rotor (200) may include a magnet. Alternatively, in a case where the first driving unit (120) of the stator (100) includes a magnet, and the second driving unit (250) of the rotor (200) may include a coil. In the exemplary embodiment of the present disclosure, the second driving unit (250) of the rotor (200) includes a magnet, for example.

An elastic member (400) is fixed at one side thereof to the rotor (200), and is fixed at the other side opposite to the one side to the stator (100), and elastically supports the rotor (200). The elastic member (400) may include a first elastic member (440) formed at a bottom end of an outer surface of the rotor (200) and a second elastic member (450) formed at an upper end of the outer surface of the rotor (200). The elastic member (400) distances the rotor (200) from the upper surface of the base (300), in a case where no driving signal is applied to the first driving unit (120) of the stator (100) and the second driving unit (250) of the rotor (200)

The cover (500) is secured to the base (300), and wraps the stator (100) and the rotor (200). The cover (500) also serves as an upper stopper stopping the rotor (200). The cover (500) is arranged with a shock absorption member (555) inhibiting noise generated by collision between the rotor (200) and the cover (500). In the exemplary embodiment of the present disclosure, the shock absorption member (555) may include any one selected from a group consisting of a sponge, a synthetic resin having elasticity and a rubber.

As a driving signal is applied to any one of the first driving unit (120) of the stator (100) and the second driving unit (250) of the rotor (200) while the rotor (200) is distanced from the upper surface of the base (300) by the elastic member (400), the rotor (200) moves to a direction facing the base (300) or to a direction facing the cover (500), whereby a gap formed between the lens (205) arranged inside the rotor (200) and the image sensor arranged at a rear side of the base (300) is adjusted to focus an outside light having passed the lens to the image sensor.

Referring to FIGS. 10 and 11 again, in a case a driving signal is not applied to the first driving unit (120) of the stator (100) or the second driving unit (250) of the rotor (200), a first stroke length (SD1) forming a bottom surface of the base (300) and the rotor (200) is shorter than a second stroke length (SD2) forming an upper surface of the cover (500) and the rotor (200). The reason of forming the first stroke length (SD1) shorter than the second stroke length (SD2) is that a user photographs a picture largely using an infinite focus of a camera module, and using a particular focus only at a particular occasion.

Referring to the graphs in FIG. 11, in order to realize an infinite focus (1 m~5 m of a distance to an object) frequently used by the image sensor arranged at the rear side of the base (300) and the lens (205) of the rotor (200), the rotor (200) floated from the base (300) in a stationary state is moved downwards facing the upper surface of the base (300) by the driving signal applied to the first driving unit (120) of the stator (100) or the second driving unit (250) of the rotor (200). The rotor (200) is first brought into contact with the upper surface of the base (300), which is to set a reference position for realizing an infinite focus.

The distance between the bottom surface of the floated stationary rotor (200) and the upper surface of the base (300) is the first stroke length (SD1), and a current amount applied to the rotor (200) is C [mA], for example, in order for the rotor (200) to contact the upper surface of the base (300).

Thereafter, in order to realize an infinite focus between the lens (205) and the image sensor while the rotor (200) is brought into contact with the upper surface of the base (300), the rotor (200) is in turn applied with a current of is D [mA] (where, D>C), whereby the rotor (200) is distanced from the upper surface of the base (300) to move to an infinite focus position. The rotor (200) on the infinite focus position is distanced approximately 40 μm from the upper surface of the base, as in the previous comparative exemplary embodiment.

Meanwhile, in case of performing a diopter (close-up) photographing, the first driving unit (120) of the stator (100) or the second driving unit (250) of the rotor (200) is applied with a current of E [mA], and the rotor (200) is brought into contact with the upper stopper which is the cover (500). At this time, a second stroke length (SD2) longer than the first stroke length (SD1) is formed between the upper surface of the floated stationary rotor (200) and the cover (500), as illustrated in FIG. 10.

Referring to FIG. 11, the rotor (200) first descends towards the base (300) by approximately 100 μm in order to realize an infinite focus between the lens (205) and the image sensor, and a current of approximately 9 [mA]~10 [mA] is required in order to descend the rotor (200) by approximately 100 μm.

As a result, it is preferable that the first stroke length (SD1) between the rotor (200) and the base (300) be shorter than the second stroke length (SD2) between the cover (500) and the rotor (200), in order to realize the rotor (200) using a low current and reduced power consumption during realization of infinite focus frequently used by a user. The second stroke length (SD2) may be twice or thrice larger than the first stroke length (SD1), based on the first stroke length (SD1).

Conversely, the first stroke length (SD1) between the rotor (200) and the base (300) be longer than the second stroke length (SD2) between the cover (500) and the rotor (200), in order to realize the rotor (200) using a low current and reduced power consumption during realization of diopter (close-up) focus frequently used by a user.

That is, the first stroke length (SD1) between the rotor (200) and the base (300) and the second stroke length (SD2) between the cover (500) and the rotor (200) may be differently formed in response to selection or propensity of a user in the exemplary embodiment of the present disclosure.

Meanwhile, the first stroke length (SD1) between the rotor (200) and the base (300) and the second stroke length (SD2) between the cover (500) and the rotor (200) may be changed in response to posture of the lens (205) of the VCM (600). In a non-limiting example, as illustrated in FIG. 10, in a case where the base (300) is arranged opposite to the ground surface, the elastic member (400) droops towards the upper surface of the base (300) in response to the self-weight of the rotor (200), whereby the first stroke length (SD1) between the rotor (200) and the base (300) decreases while the second stroke length (SD2) between the cover (500) and the rotor (200) increases. However, even in this case, the first stroke length (SD1) between the rotor (200) and the base (300) is shorter than the second stroke length (SD2) between the cover (500) and the rotor (200).

Figure 12:
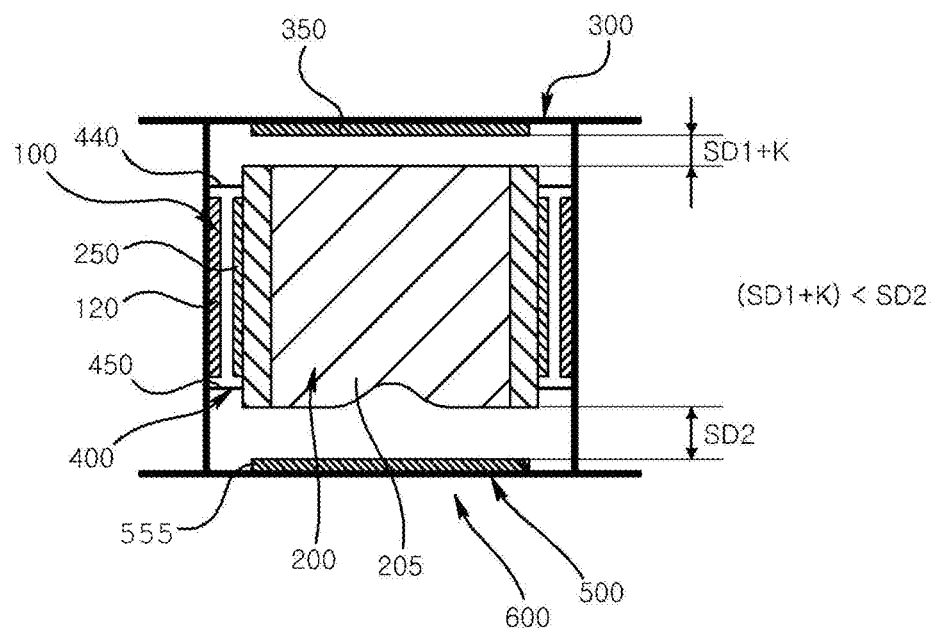
FIG. 12 is a cross-sectional view illustrating a state of a reversed VCM of FIG. 10.

FIG. 12 is a cross-sectional view illustrating a state of a reversed VCM of FIG. 10.

Referring to FIG. 12, in a case where the cover (500) is arranged opposite to the ground surface, the elastic member (400) droops towards the cover (500) in response to the self-weight of the rotor (200), whereby the first stroke length (SD1) between the rotor (200) and the base (300) increases while the second stroke length (SD2) between the cover (500) and the rotor (200) decreases. However, even in this case, the first stroke length (SD1) between the rotor (200) and the base (300) is shorter than the second stroke length (SD2) between the cover (500) and the rotor (200). That is, the first stroke length (SD1) is a length including the drooped length of the rotor (200).

Figure 13:
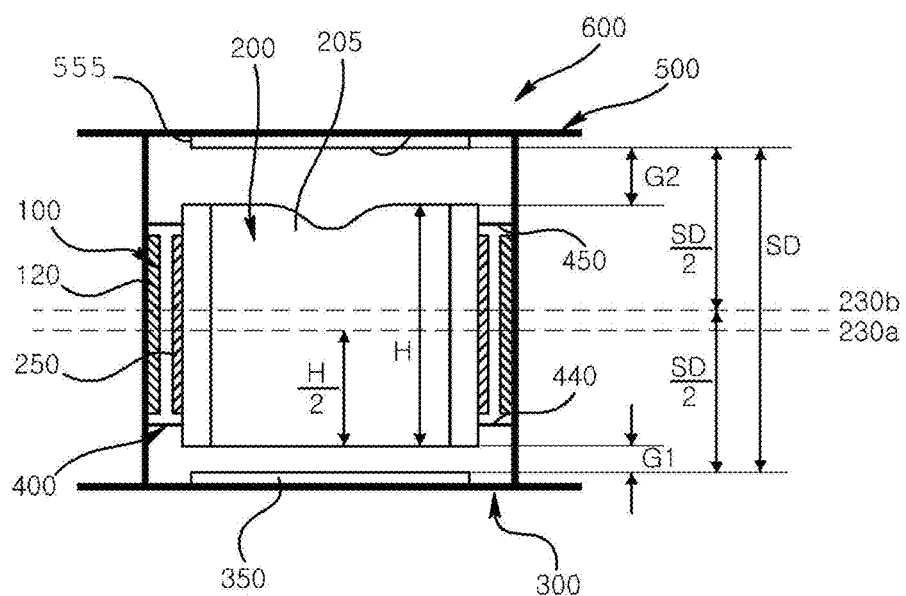
FIG. 13 is a schematic cross-sectional view illustrating a VCM according to another exemplary embodiment of the present disclosure.

FIG. 13 is a schematic cross-sectional view illustrating a VCM according to another exemplary embodiment of the present disclosure.

Referring to FIG. 13, a voice coil motor (hereinafter referred to as VCM, 600) may include a stator (100), a rotor (200), a base (300), an elastic member (400), and a cover (500).

The stator (100) is arranged on the base (300), and a rotor (200) coupled to a lens (205) is arranged on the base (300) corresponding to an interior of the stator (100). The elastic member (400) is coupled to the stator (100) and the rotor (200) to allow the rotor (200) to float from an upper surface of the base (300), in a case where no driving signal such as a current is applied to the stator (100) and the rotor (200), and the cover (500) is coupled to the base (300).

Hereinafter, a position bisecting the upper surface and a bottom surface of the rotor (200) is defined as a first center part (230a), and a position bisecting a bottom surface of the cover (500) and the upper surface of the base (300) is defined as a second center part (230b).

In the exemplary embodiment of the present disclosure, in order to realize the low current and reduced power consumption characteristics during realization of infinite focus frequently used by a user, the first center part (230a) which is a position bisecting the upper surface and the bottom surface of the rotor (200) is located below the second center part (230b) bisecting a bottom surface of the cover (500) and the upper surface of the base (300).

A first gap (G1) formed between the base (300) and the rotor (200) is narrower than a second gap (G2) formed between the rotor (200) and the cover (500) by arranging the first center part (230a) which is a position bisecting the upper surface and the bottom surface of the rotor (200) below the second center part (230b) bisecting a bottom surface of the cover (500) and the upper surface of the base (300).

Furthermore, the first gap (G1) formed between the base (300) and the rotor (200) may be formed twice or thrice narrower than the second gap (G2) formed between the rotor (200) and the cover (500).

As apparent from the foregoing, the voice coil motor according to the present disclosure has an industrial adaptability in that a rotor is floated from an upper surface of a base when a driving signal is not applied, and a length of a stroke length or a gap between the floated rotor and the upper surface of the base is differently formed from a stroke length or a gap between the floated rotor and the cover to realize a low current consumption characteristic or a low power consumption characteristic.

The above-mentioned VCM according to the present disclosure may, however, be embodied in many different forms and should not be construed as limited to the embodiment set forth herein. Thus, it is intended that embodiment of the present disclosure may cover the modifications and variations of this disclosure provided they come within the scope of the appended claims and their equivalents. While particular features or aspects may have been disclosed with respect to several embodiments, such features or aspects may be selectively combined with one or more other features and/or aspects of other embodiments as may be desired.

What is claimed is:

1. A camera module comprising:
a cover;
a base;
a bobbin disposed between the cover and the base;
a lens disposed above the base;
a coil disposed on the bobbin;
a magnet facing the coil and disposed on the cover; and
an image sensor disposed below the bobbin and the lens,
wherein the bobbin is spaced apart from both the base and the cover at an initial position when no current for driving the camera module is applied to the coil,
wherein the bobbin is spaced apart from both the base and the cover at an infinite focus position,
wherein the bobbin is spaced apart from both the base and the cover at a macro focus position,
wherein the bobbin is disposed between the infinite focus position and the macro focus position at the initial position, and wherein a distance between the base and the bobbin at the infinite focus position is different from a distance between the cover and the bobbin at the macro focus position.

2. The camera module of claim 1, wherein the bobbin is disposed nearer to the base than to the cover at the infinite focus position, and wherein the bobbin is disposed nearer to the cover than to the base at the macro focus position.

3. The camera module of claim 1, wherein the bobbin is configured to move in a downward direction from the initial position and to move in an upward direction from the initial position.

4. The camera module of claim 3, wherein the infinite focus position of the bobbin is spaced apart from the initial position of the bobbin in the downward direction,
wherein the macro focus position of the bobbin is spaced apart from the initial position of the bobbin in the upward direction.

5. The camera module of claim 3, wherein the bobbin includes a first stopper configured to contact the base in the downward direction and a second stopper configured to contact the cover in the upward direction.

6. The camera module of claim 5, wherein the first stopper of the bobbin is spaced apart from the base at the infinite focus position and the second stopper of the bobbin is spaced apart from the cover at the macro focus position.

7. The camera module of claim 5, wherein the first stopper protrudes in the downward direction from a lower surface of the bobbin facing the base, and
wherein the second stopper protrudes in the upward direction from an upper surface of the bobbin facing the cover.

8. The camera module of claim 5, wherein a distance between the first stopper and the base at the infinite focus position is 5 µm to 20 µm.

9. The camera module of claim 5, wherein a distance between the second stopper and the cover at the macro focus position is 5 µm to 20 µm.

10. The camera module of claim 5, wherein a distance between the first stopper and the base at the infinite focus position is longer than a distance between the second stopper and the cover at the macro focus position.

11. The camera module of claim 5, wherein at the initial position, a first distance between the first stopper and the base is different from a second distance between the second stopper and the cover.

12. The camera module of claim 11, wherein the first distance is shorter than the second distance.

13. The camera module of claim 1, wherein the cover includes an upper plate having an opening and a lateral plate extending from an edge of the upper plate toward the base.

14. A mobile phone comprising the camera module of claim 1.

15. The camera module of claim 1, wherein the distance between the infinite focus position and the base is longer than the distance between the macro focus position and the cover.

16. The camera module of claim 1, wherein a distance between the infinite focus position and the initial position is different from a distance between the macro focus position and the initial position.

17. The camera module of claim 16, wherein the distance between the infinite focus position and the initial position is shorter than the distance between the macro focus position and the initial position.

18. The camera module of claim 1, wherein the cover comprises an upper plate and a lateral plate extending from the upper plate,
wherein the base is coupled to the lateral plate of the cover, and
wherein the distance between the base and the bobbin at the infinite focus position is different from a distance between the upper plate of the cover and the bobbin at the macro focus position.

19. A mobile phone comprising a camera module,
wherein the camera module comprises;
a cover;
a bobbin disposed in the cover;
a lens coupled to the bobbin;
a coil disposed on the bobbin;
a magnet facing the coil and disposed on the cover;
a base spaced apart from the bobbin; and
an image sensor disposed below the bobbin and the lens,
wherein the bobbin is spaced apart from both the base and the cover at an initial position when no current for driving the camera module is applied to the coil,
wherein, when a backward current is applied to the coil, the bobbin moves in a downward direction toward an infinite focus position not contacted with the base,
wherein, when a forward current is applied to the coil, the bobbin moves in an upward direction toward a macro focus position not contacted with the cover,
wherein a distance between the infinite focus position of the bobbin and the initial position of the bobbin is different from a distance between the macro focus position of the bobbin and the initial position of the bobbin, and
wherein a distance between the bobbin and the base is different from a distance between the bobbin and the cover at the initial position of the bobbin.

20. The mobile phone of claim 19, wherein the distance between the infinite focus position of the bobbin and the initial position of the bobbin is shorter than the distance between the macro focus position of the bobbin and the initial position of the bobbin.

21. The mobile phone of claim 19, wherein the bobbin is disposed nearer to the base than to the cover at the infinite focus position, and wherein the bobbin is disposed nearer to the cover than to the base at the macro focus position.

22. The mobile phone of claim 19, wherein the bobbin includes a first stopper configured to contact the base in the downward direction and a second stopper configured to contact the cover in the upward direction.

23. The mobile phone of claim 22, wherein a distance between the first stopper and the base at the infinite focus position is longer than a distance between the second stopper and the cover at the macro focus position.

24. The mobile phone of claim 22, wherein at the initial position, a first distance between the first stopper and the base is different from a second distance between the second stopper and the cover.

25. The mobile phone of claim 24, wherein the first distance is shorter than the second distance.

26. The mobile phone of claim 19, wherein a distance between the infinite focus position and the base is different from a distance between the macro focus position and the cover.

27. The mobile phone of claim 26, wherein the distance between the infinite focus position and the base is longer than the distance between the macro focus position and the cover.

28. The mobile phone of claim 19, wherein the cover comprises an upper plate and a lateral plate extending from the upper plate,
    wherein the base is coupled to the lateral plate of the cover, and
    wherein the distance between the bobbin and the base is different from a distance between the bobbin and the upper plate of the cover at the initial position of the bobbin.

* * * * *